United States Patent
Yamamoto et al.

(10) Patent No.: US 7,399,523 B2
(45) Date of Patent: Jul. 15, 2008

(54) SPINEL FERRIMAGNETIC PARTICLES AND MAGNETIC RECORDING MEDIUM

(75) Inventors: Hiroshi Yamamoto, Kanagawa (JP); Natsuki Wakamura, Kanagawa (JP); Naoki Yoshida, Kanagawa (JP)

(73) Assignee: Meiji University Legal Person, Tokyo (JP)

( * ) Notice: Subject to any disclaimer, the term of this patent is extended or adjusted under 35 U.S.C. 154(b) by 242 days.

(21) Appl. No.: 10/530,330

(22) PCT Filed: Oct. 16, 2003

(86) PCT No.: PCT/JP03/13240

§ 371 (c)(1),
(2), (4) Date: Apr. 5, 2005

(87) PCT Pub. No.: WO2004/100190

PCT Pub. Date: Nov. 18, 2004

(65) Prior Publication Data
US 2006/0292403 A1    Dec. 28, 2006

(30) Foreign Application Priority Data
May 7, 2003    (JP)    ............... 2003-129274

(51) Int. Cl.
B32B 5/16    (2006.01)
(52) U.S. Cl. ..................... 428/329; 428/407
(58) Field of Classification Search ........... 428/407, 428/329
See application file for complete search history.

(56) References Cited

U.S. PATENT DOCUMENTS

| | | | |
|---|---|---|---|
| 4,810,401 A | | 3/1989 | Mair et al. |
| 5,576,114 A | * | 11/1996 | Kurisu et al. ............. 428/842.8 |
| 5,616,414 A | * | 4/1997 | Hopstock et al. ............. 428/402 |
| 5,626,956 A | * | 5/1997 | Hopstock et al. ............. 428/323 |
| 5,648,014 A | * | 7/1997 | Hatatani et al. ............. 252/62.56 |
| 5,648,134 A | * | 7/1997 | Shiratori et al. ............. 428/64.1 |
| 5,702,757 A | * | 12/1997 | Ohmura ............. 427/131 |
| 5,766,763 A | * | 6/1998 | Kurisu et al. ............. 428/403 |
| 6,291,052 B1 | * | 9/2001 | Takahashi et al. ............. 428/141 |
| 6,537,684 B1 | * | 3/2003 | Doerner et al. ............. 428/611 |

(Continued)

FOREIGN PATENT DOCUMENTS

| | | |
|---|---|---|
| DE | 3619746 | 12/1987 |
| EP | 0249229 | 12/1987 |
| EP | 0460714 | 12/1991 |
| JP | 50-078599 | 6/1975 |
| JP | 52-007160 | 2/1977 |

(Continued)

OTHER PUBLICATIONS

Yamamoto et al. IEEE Transactions on Magnetics, vol. 38, No. 5 Sep. 2002.*

(Continued)

*Primary Examiner*—Keith D. Hendricks
*Assistant Examiner*—Gary Harris
(74) *Attorney, Agent, or Firm*—Greenblum & Bernstein, P.L.C.

(57) ABSTRACT

Provided is a magnetic material with excellent magnetic properties to be used for recording media, which contains small ratio of superparamagnetic fine particles while maintaining high coercivity. It is spinel ferrimagnetic particles, a composition equation of which when prepared is $(CoO)_{0.5-x}(NiO)_{0.5-y}(MO)_{x+y} \cdot n/2(Fe_2O_3)$ (M is a bivalent metal except Co and Ni) and a value of n (molar ratio)=Fe/(Co+Ni+Zn) is 2.0<n<3.0, which is larger than stoichiometric amount (n=2) of a spinel ferrite and less than that of 1.5 times, and values of x, y satisfy $0 \leq x < 0.5$, $0 \leq y < 0.5$, $0 < x+y < 0.5$, wherein, also, superparamagnetic fine particles contained in the spinel ferrimagnetic particles is 5% by mass or less.

7 Claims, 12 Drawing Sheets

U.S. PATENT DOCUMENTS

| | | | |
|---|---|---|---|
| 6,764,608 | B2 | 7/2004 | Yamamoto et al. |
| 6,830,824 | B2 * | 12/2004 | Kikitsu et al. ............ 428/828.1 |
| 7,033,685 | B2 * | 4/2006 | Lee et al. .................... 428/828 |
| 7,105,239 | B2 * | 9/2006 | Oikawa et al. ........... 428/828.1 |
| 2001/0038928 | A1 * | 11/2001 | Nakamigawa et al. .................... 428/694 BS |
| 2003/0183800 | A1 * | 10/2003 | Yamamoto et al. ....... 252/62.54 |
| 2005/0074633 | A1 * | 4/2005 | Lee et al. ................. 428/694 T |
| 2005/0094529 | A1 * | 5/2005 | Lee et al. ................. 369/59.12 |
| 2005/0214588 | A1 * | 9/2005 | Iwasaki et al. .............. 428/831 |
| 2006/0083948 | A1 * | 4/2006 | Kawaguchi et al. ...... 428/692.1 |
| 2006/0188755 | A1 * | 8/2006 | Yamamoto et al. ....... 428/842.5 |

FOREIGN PATENT DOCUMENTS

| | | |
|---|---|---|
| JP | 63-011525 | 1/1988 |
| JP | 5-032420 | 2/1993 |
| JP | 6-020820 | 1/1994 |
| JP | 6-045129 | 2/1994 |
| JP | 6-053022 | 2/1994 |
| JP | 6-224020 | 8/1994 |
| JP | 7-037711 | 2/1995 |
| JP | 7-061814 | 3/1995 |
| JP | 7-267645 | 10/1995 |
| JP | 7-315844 | 12/1995 |
| JP | 8-026731 | 1/1996 |
| JP | 8-119635 | 5/1996 |
| JP | 8-208231 | 8/1996 |
| JP | 11-003813 | 1/1999 |
| JP | 11-224812 | 8/1999 |
| JP | 2000-103616 | 4/2000 |
| JP | 2001-048529 | 2/2001 |
| JP | 2002-313618 | 10/2002 |

OTHER PUBLICATIONS

IEEE Transactions on Magnetics, vol. 38, No. 5 Sep. 2002.*
Synthesis and characterization of A-Sn-substituted (A=Zn, Ni, Co) BaM-hexaferrite powders and ceramics, D. Lisjak, M. Drofenik, Journal of European Ceramic Society 24 (2004) 1841-1845.*
Fuchun Zhang et al., "Ni Addition into Co Ferrite-Plated Films", Journal of Japan Society of Powder And Powder metallurgy, vol. 47, No. 2, pp. 171-174. 25th of Feb. 2000.
English Language Abstract of JP 5-032420, published Feb. 9, 1993.
English Language Abstract of JP 6-020820, published Jan. 28, 1994.
English Language Abstract of JP 6-053022, published Feb. 25, 1994.
English Language Abstract of JP 7-037711, published Feb. 7, 1995.
English Language Abstract of JP 7-061814, published Mar. 7, 1995.
English Language Abstract of JP 7-267645, published Oct. 17, 1995.
English Language Abstract of JP 8-026731, published Jan. 30, 1996.
English Language Abstract of JP 8-208231, published Aug. 13, 1996.
English Language Abstract of JP 11-224812, published Aug. 17, 1999.
English Language Abstract of JP 2000-103616, published Apr. 11, 2000.
English Language Abstract of JP 2001-048529, published Feb. 20, 2001.
English Language Abstract of JP 2002-313618, published Oct. 25, 2002.
English Language Abstract of JP 11-003813, published Jan. 6, 1999.
English Language Abstract of JP 6-045129, published Feb. 18, 1994.
English Language Abstract of JP 7-267645, published Oct. 17, 1995.
English Language Abstract of JP 6-224020, published Aug. 12, 1994.
English Language Abstract of JP 8-119635, published May. 14 1996.
English Language Abstract of JP 7-315844, published Dec. 5, 1995.
Abstracts of Spring Meeting of Japan Society of Powder and Powder Metallurgy, 2003, pp. 1, 85, 86 and 137, accompanied by an English language abstract.
Fuchun Zhang et al., "Solution Conditions for CoNi Ferrite Perpendicular Magnetic Recording Thin Films", Journal of the Japan Society Powder and Powder Metallurgy, vol. 47, No. 7, pp. 730-732 (2000).
H. Yamamoto et al., "Magnetic Properties of Co-Mi Spinel Ferrite Fine Particles with High Coercivity Prepared by the Chemical Coprecipitation Method", IEEE Transaction on Magnetics, vol. 38, No. 5, pp. 3488-3492, Sep. 2002.
S. Chikazumi et al., "Physics of Ferromagnetic Substance, Second Edition", Shokabo Publishing Co., Ltd., Chapter 12, pp. 13, 1984.
I.S. Jacobs et al., "Magnetic Anisotropy and Rotational Hysteresis Elongated Fine-Particle Magnets", Journal of Applied Physics, vol. 28, No. 4, pp. 467-473, Apr. 1957.
D.M. Paige et al., "High Precision Torque Hysteresis Measurements on Fine Particle Systems", IEEE Trans. Magen, vol. 20, pp. 1852-1854, 1984.
Cho et al., "Effect of Adding Ni to Co Ferrite Thin Film", Powder and Powder Metallurgy, vol. 7, No. 2, p. 171-174, 25th of Feb. 2000.

* cited by examiner

FIG. 2

| EXAMPLES | Fe³⁺ CONCENTRATION (mol/l) | MOUNT OF Fe³⁺ SOLUTION (ml) | Co²⁺ CONCENTRATION (mol/l) | MOUNT OF Co²⁺ SOLUTION (ml) | Ni²⁺ CONCENTRATION (mol/l) | MOUNT OF Ni²⁺ SOLUTION (ml) | Zn²⁺ CONCENTRATION (mol/l) | MOUNT OF Zn²⁺ SOLUTION (ml) | pH VALUE OF PRECIPITATION SLURRY (pH) | Fe/(Co+Ni+Zn) n-MOLAR RATIO | ZnO SUBSTITUTION AMOUNT (x+y) |
|---|---|---|---|---|---|---|---|---|---|---|---|
| 1-2 | 0.25 | 200 | 0.1 | 100 | 0.1 | 90 | 0.1 | 10 | 13.0 | 2.5 | 0.05 |
| 2-2 | 0.225 | 200 | 0.1 | 100 | 0.1 | 90 | 0.1 | 10 | 13.0 | 2.25 | 0.05 |
| 2-3 | 0.25 | 200 | 0.1 | 100 | 0.1 | 90 | 0.1 | 10 | 13.0 | 2.5 | 0.05 |
| 2-4 | 0.275 | 200 | 0.1 | 100 | 0.1 | 90 | 0.1 | 10 | 13.0 | 2.75 | 0.05 |
| 3-2 | 0.25 | 200 | 0.1 | 100 | 0.1 | 90 | 0.1 | 10 | 13.0 | 2.5 | 0.05 |
| 3-3 | 0.25 | 200 | 0.1 | 100 | 0.1 | 90 | 0.1 | 10 | 13.3 | 2.5 | 0.05 |

FIG. 3

| EXAMPLES | COERCIVITY HcJ (kA/m) | SATURATION MAGNETIZATION $\sigma$S (Wb·m/kg) | REMANENT MAGNETIZATION $\sigma$r (Wb·m/kg) |
|---|---|---|---|
| 1−2 | 372.0 | $62.0 \times 10^{-6}$ | $36.6 \times 10^{-6}$ |
| 2−2 | 330.4 | $61.9 \times 10^{-6}$ | $36.6 \times 10^{-7}$ |
| 2−3 | 372.0 | $62.0 \times 10^{-6}$ | $36.6 \times 10^{-6}$ |
| 2−4 | 425.8 | $43.3 \times 10^{-6}$ | $19.5 \times 10^{-6}$ |
| 3−2 | 372.6 | $62.0 \times 10^{-6}$ | $36.6 \times 10^{-6}$ |
| 3−3 | 372.9 | $62.8 \times 10^{-6}$ | $37.0 \times 10^{-6}$ |

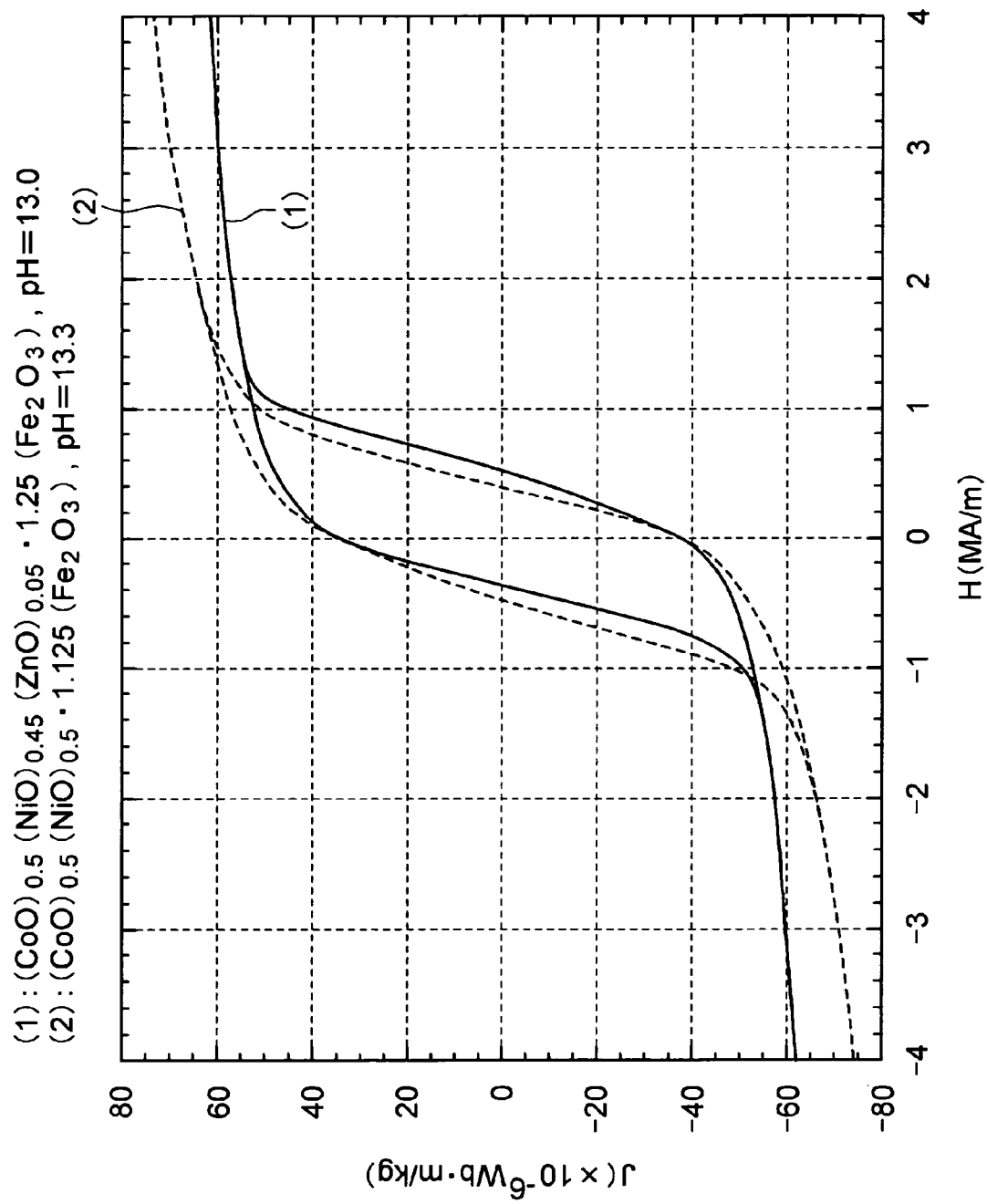

FIG.10

| Fe/(Co+Ni+Mn) (n-MOLAR RATIO) | pH VALUE OF PRECIPITATION SLURRY (pH) | MnO SUBSTITUTION AMOUNT (X+Y) | COERCIVITY HcJ (kA/m) | SATURATION MAGNETIZATION $\sigma s$ (Wb·m/kg) | REMANENT MAGNETIZATION $\sigma r$ (Wb·m/kg) |
|---|---|---|---|---|---|
| 2.25 | 13.3 | 0.05 | 529.2 | $55.9 \times 10^{-6}$ | $30.7 \times 10^{-6}$ |
| 2.25 | 13.3 | 0.075 | 561.9 | $52.7 \times 10^{-6}$ | $28.1 \times 10^{-6}$ |
| 2.25 | 13.3 | 0.1 | 567.5 | $55.5 \times 10^{-6}$ | $30.2 \times 10^{-6}$ |
| 2.25 | 13.3 | 0.125 | 589.7 | $55.5 \times 10^{-6}$ | $30.2 \times 10^{-6}$ |
| 2.25 | 13.3 | 0.15 | 566.6 | $55.3 \times 10^{-6}$ | $29.9 \times 10^{-6}$ |
| 2.25 | 13.3 | 0.175 | 582.0 | $58.0 \times 10^{-6}$ | $32.2 \times 10^{-6}$ |
| 2.25 | 13.3 | 0.2 | 496.7 | $61.8 \times 10^{-6}$ | $34.9 \times 10^{-6}$ |
| 2.25 | 13.3 | 0.3 | 356.6 | $66.0 \times 10^{-6}$ | $36.4 \times 10^{-6}$ |
| 2.25 | 13.0 | 0.05 | 461.4 | $52.3 \times 10^{-6}$ | $29.5 \times 10^{-6}$ |
| 2.25 | 13.0 | 0.1 | 432.9 | $56.1 \times 10^{-6}$ | $31.7 \times 10^{-6}$ |
| 2.25 | 13.0 | 0.2 | 371.7 | $59.5 \times 10^{-6}$ | $33.3 \times 10^{-6}$ |
| 2.25 | 13.0 | 0.3 | 247.5 | $64.1 \times 10^{-6}$ | $34.6 \times 10^{-6}$ |

FIG.11

| Fe/(Co+Ni+Mn) (n-MOLAR RATIO) | pH VALUE OF PRECIPITATION SLURRY (pH) | MnO SUBSTITUTION AMOUNT (X+Y) | COERCIVITY HcJ (kA/m) | SATURATION MAGNETIZATION $\sigma s$ (Wb·m/kg) | REMANENT MAGNETIZATION $\sigma r$ (Wb·m/kg) |
|---|---|---|---|---|---|
| 2.5 | 13.3 | 0.05 | 556.0 | $45.4 \times 10^{-6}$ | $21.8 \times 10^{-6}$ |
| 2.5 | 13.3 | 0.1 | 561.5 | $45.0 \times 10^{-6}$ | $20.6 \times 10^{-6}$ |
| 2.5 | 13.3 | 0.2 | 530.1 | $45.4 \times 10^{-6}$ | $20.4 \times 10^{-6}$ |
| 2.5 | 13.3 | 0.3 | 415.1 | $57.6 \times 10^{-6}$ | $28.5 \times 10^{-6}$ |
| 2.5 | 13.3 | 0.4 | 247.8 | $66.1 \times 10^{-6}$ | $33.9 \times 10^{-6}$ |
| 2.5 | 13.0 | 0.05 | 555.2 | $40.7 \times 10^{-6}$ | $19.4 \times 10^{-6}$ |
| 2.5 | 13.0 | 0.1 | 527.1 | $46.8 \times 10^{-6}$ | $23.9 \times 10^{-6}$ |
| 2.5 | 13.0 | 0.2 | 437.0 | $54.0 \times 10^{-6}$ | $28.4 \times 10^{-6}$ |
| 2.5 | 13.0 | 0.3 | 282.2 | $60.5 \times 10^{-6}$ | $31.5 \times 10^{-6}$ |
| 2.25 | 13.0 | 0.4 | 208.7 | $62.7 \times 10^{-6}$ | $30.9 \times 10^{-6}$ |

FIG.12

| Fe/(Co+Ni+Mn) (n-MOLAR RATIO) | pH VALUE OF PRECIPITATION SLURRY (pH) | MnO SUBSTITUTION AMOUNT (X+Y) | COERCIVITY HcJ (kA/m) | SATURATION MAGNETIZATION $\sigma s$ (Wb·m/kg) | REMANENT MAGNETIZATION $\sigma r$ (Wb·m/kg) |
|---|---|---|---|---|---|
| 2.75 | 13.3 | 0.05 | 501.8 | $39.4 \times 10^{-6}$ | $35.3 \times 10^{-6}$ |
| 2.75 | 13.3 | 0.1 | 513.8 | $38.9 \times 10^{-6}$ | $41.6 \times 10^{-6}$ |
| 2.75 | 13.3 | 0.2 | 498.0 | $39.7 \times 10^{-6}$ | $47.0 \times 10^{-6}$ |
| 2.75 | 13.3 | 0.3 | 476.2 | $49.6 \times 10^{-6}$ | $50.3 \times 10^{-6}$ |
| 2.75 | 13.3 | 0.4 | 339.1 | $54.8 \times 10^{-6}$ | $57.9 \times 10^{-6}$ |
| 2.75 | 13.0 | 0.05 | 503.6 | $35.3 \times 10^{-6}$ | $13.8 \times 10^{-6}$ |
| 2.75 | 13.0 | 0.1 | 516.5 | $41.6 \times 10^{-6}$ | $19.1 \times 10^{-6}$ |
| 2.75 | 13.0 | 0.2 | 454.9 | $47.0 \times 10^{-6}$ | $22.2 \times 10^{-6}$ |
| 2.75 | 13.0 | 0.3 | 398.3 | $50.3 \times 10^{-6}$ | $23.9 \times 10^{-6}$ |
| 2.75 | 13.0 | 0.4 | 235.4 | $57.9 \times 10^{-6}$ | $27.5 \times 10^{-6}$ |

SPINEL FERRIMAGNETIC PARTICLES AND MAGNETIC RECORDING MEDIUM

TECHNICAL FIELD

The present invention relates to metal oxide magnetic particles and a magnetic recording medium containing the same and, more specifically, to spinel ferrimagnetic particles containing Co, Ni and other bivalent metal and a magnetic recording medium containing the same.

BACKGROUND ART

Conventionally, researches have been carried out on spinel ferrite which is a composite oxide containing iron as a magnetic material to be used as recording media of data-filing tapes. There are various compositions (M, $Fe)_3O_4$ (M=Fe(II), Co, Ni, Mn, Al, Cu, Zn, etc.) considered as the spinel ferrite, and one of the examples is Co ferrite. Co ferrite exhibits a large value of magnetocrystalline anisotropy constant so that it does not easily become superparamagnetic particles even if the particles become finer. Thus, it can maintain excellent magnetic properties and has been expected to be utilized as a high-density magnetic recording material.

Conventionally, a known method for preparing the aforementioned Co ferrite is to form it as a thin film by using a spin-spray-ferrite plating method. In order to further improve the magnetic properties of the magnetic material, a known research has been carried out in regards to forming Co-Ni ferrite thin films by the above-described method (see Zhang et al., "Ni Addition into Co Ferrite-plated Films", Powder and Powder Metallurgy, vol. 47, No. 2, P 171-174, 25 of Feb., 2000).

Although Co—Ni ferrite which has been conventionally used is ferrimagnetic substance, it is a bulk material or of a thin film type. Thus, the coercivity is less than 239 [kA/m] (3000 [Oe]) even at the maximum, so that it is difficult to further improve the recording density of the recording medium using this magnetic material. That is, the spinel ferrites are used for tapes as recording media, however, the coercivity cannot be improved so that there raises an issue that the performance of the recording medium cannot be improved more than that of the present ones.

In the meantime, it has been examined to make finer particles of the magnetic material to be applicable for the recording media, and researches have been actively carried out on, for example, Ba ferrite as magnetoplumbite ferrite (M-type ferrite). However, although the magnetic particles with an average particle diameter of 30 [nm]-40 [nm] can be prepared, the coercivity still remains 239 [kA/m] (3000)[Oe]) at the maximum. Thus, the coercivity is still low.

That is, with the conventional magnetic materials, it is impossible to improve the coercivity more than that of the present level, so that it is difficult to achieve still higher recording density of the recording medium.

For overcoming the aforementioned shortcomings, presently, researches have been carried out in regards to Co—Ni spinel ferrite particles which, conventionally, had been the thin films or bulk materials. One of the examples is disclosed in a literature by H. Yamamoto, Y. Nissato, "Magnetic Properties of Co—Ni Spinel Ferrite Fine Particles with High Coercivity Prepared by the Chemical Coprecipitation Method", IEEE Transaction on Magnetics, vol. 38, No. 5 pp 3488-3492, September 2002. In this literature, in order to improve the magnetic properties, especially, the coercivity of the conventional Co spinel ferrite fine particles, so as to provide a magnetic material with high coercivity HcJ, a part of Co is substituted with Ni for making Co coexists with Ni. Specifically, by setting the value of Fe/(Co+Ni) within a specific range, it is possible to obtain a magnetic material with relatively high coercivity.

However, with the above-described Co—Ni spinel ferrite, it is impossible to achieve small and uniform particle diameter, so that the coercivity of the particles also becomes non-uniform. Further, since there are a large percentage of superparamagnetic particles contained in the magnetic particles, the magnetic state varies according to the intensity of the surrounding magnetic field so that the magnetism cannot be stably maintained.

Therefore, when the magnetic fine particles of the above-described conventional case are used for a data storage recording medium, specifically for a magnetic tape, transcribing of recorded data is easily generated in a laminated area where the tape is being wound. That is, basically, if the coercivity is not uniform, the recorded data cannot be stably maintained in an area with low coercivity. Thus it is possible that the magnetic transcription is caused between magnetic tapes which overlap with each other. Moreover, in the area with the superparamagnetism, the magnetization intensity becomes unstable according to the magnetic state of the overlapping area of the magnetic tape so that the stable magnetic state cannot be maintained. As described above, when using the conventional magnetic fine particles for the magnetic recording media, the performance of recording information is deteriorated.

On the other hand, it is possible to remove the superparamagnetic substance from the generated magnetic fine particles in order to achieve the stable magnetic state. However, it requires time and work for this to be done, which increases the manufacturing cost.

Moreover, the values of saturation magnetization and remanent magnetization are not necessarily high. Thus, the magnetic properties are still insufficient to be used for the data storage recording media.

An object of the present invention is to improve the inconvenience of the conventional case described above and, specifically, to provide a magnetic material which can be preferably used for magnetic recording media, in which the content of the superparamagnetic fine particles is low while the high coercivity is maintained.

DISCLOSURE OF THE INVENTION

In order to overcome the foregoing shortcomings, the spinel ferrimagnetic particles of the present invention is expressed by a composition formula $(CoO)_{0.5-x}(NiO)_{0.5-y}(MO)_{x+y} \cdot n/2(Fe_2O_3)$ (M is a bivalent metal except Co and Ni) at the time of preparation, where a value of n (molar ratio)=Fe/(Co+Ni+M) is 2.0<n<3.0, which is larger than stoichiometric amount (n=2) of a spinel ferrite and less than that of 1.5 times, and values of said x, y satisfy 0<x<0.5, 0y0.5, 0x+y<0.5. Further, superparamagnetic fine particles contained in the spinel ferrimagnetic particles is 5% by mass or less. Here, the M as the bivalent metal is preferable to be Zn, Mn.

Especially, it is desirable that the value of n be 2.2<n<2.8; the values of x, y satisfy $0 \leq x<0.2$, $0 \leq y<0.2$, 0.01<x+y<0.2; and superparamagnetic fine particles contained in the spinel ferrimagnetic particles be 2% by mass or less. At this time, it is preferable that coercivity be 239-637 [kA/m] and saturation magnetization be $50.3 \times 10^{-6}$-$88.0 \times 10^{-6}$ [Wb·m/kg].

It is desirable that the above-described spinel ferrimagnetic particles be prepared through a forming process which comprises the steps of: preparing mixed solutions by mixing each solution containing iron, cobalt, nickel and M as water soluble metallic salts, respectively, by satisfying the conditions of x, y, n; preparing solutions containing coprecipitation substance by adding an alkaline aqueous solution to the mixed solutions and adjusting pH value to be $12.0 \leq pH \leq 14.0$; and producing fine particles through performing heat-treating on the solutions containing coprecipitation substance at 80° C.-120° C., and then performing filtration, washing and drying. At this time, it is more desirable that the step of preparing the solutions containing coprecipitation substance be a step of preparing solutions containing coprecipitation substance by adjusting pH values to $13.0 < pH < 13.7$.

The spinel ferrimagnetic particles prepared as described above are magnetic particles with very small and uniform particle diameters and, further, are magnetic material with excellent magnetic properties having high coercivity. The content of superparamagnetic fine particles is substantially zero, so that stable recording can be maintained when used for recording media. Especially, it is an excellent magnetic material to be used for the recording media, even for a magnetic tape which is used in a wound state without causing magnetic transcription.

BRIEF DESCRIPTION OF THE DRAWINGS

FIG. 2 is a table showing a list of conditions when preparing Co—Ni—Zn system spinel ferrimagnetic particles of Examples 1 to 3;

FIG. 3 is a table showing a list of magnetic properties of the magnetic particles shown in FIG. 2;

FIG. 9 is a graph showing the hysteresis loop of the magnetic sheet (Co—Ni—Zn system spinel ferrite) fabricated in Example 4 and that of a conventional Co—Ni system spinel ferrite;

FIG. 10 is a table showing a list of preparing conditions and magnetic properties of Co—Ni—Mn system ferrite magnetic particles of Example 7;

FIG. 11 is a table showing a list of preparing conditions and magnetic properties of Co—Ni—Mn system ferrite magnetic particles of Example 7; and FIG. 12 is a table showing a list of preparing conditions and magnetic properties of Co—Ni—Mn system ferrite magnetic particles of Example 7.

BEST MODE FOR CARRYING OUT THE INVENTION

In the followings, spinel ferrite fine particles as of the present invention will be described by referring to FIG. 1-FIG. 12. The present invention discloses the spinel ferrimagnetic particles, a composition equation of which when prepared is $(CoO)_{0.5-x}(NiO)_{0.5-y}(MO)_{x+y} \cdot n/2(Fe_2O_3)$ (M is a bivalent metal except Co and Ni). Specifically, described is a case where M, the bivalent metal, is Zn. It has been confirmed by an experiment that the similar magnetic properties as will be described below can be obtained also in the case where M is other bivalent metals (for example, Mn, Mg, etc.) Especially, Example 7 discloses a case of using Mn.

Figure 1:
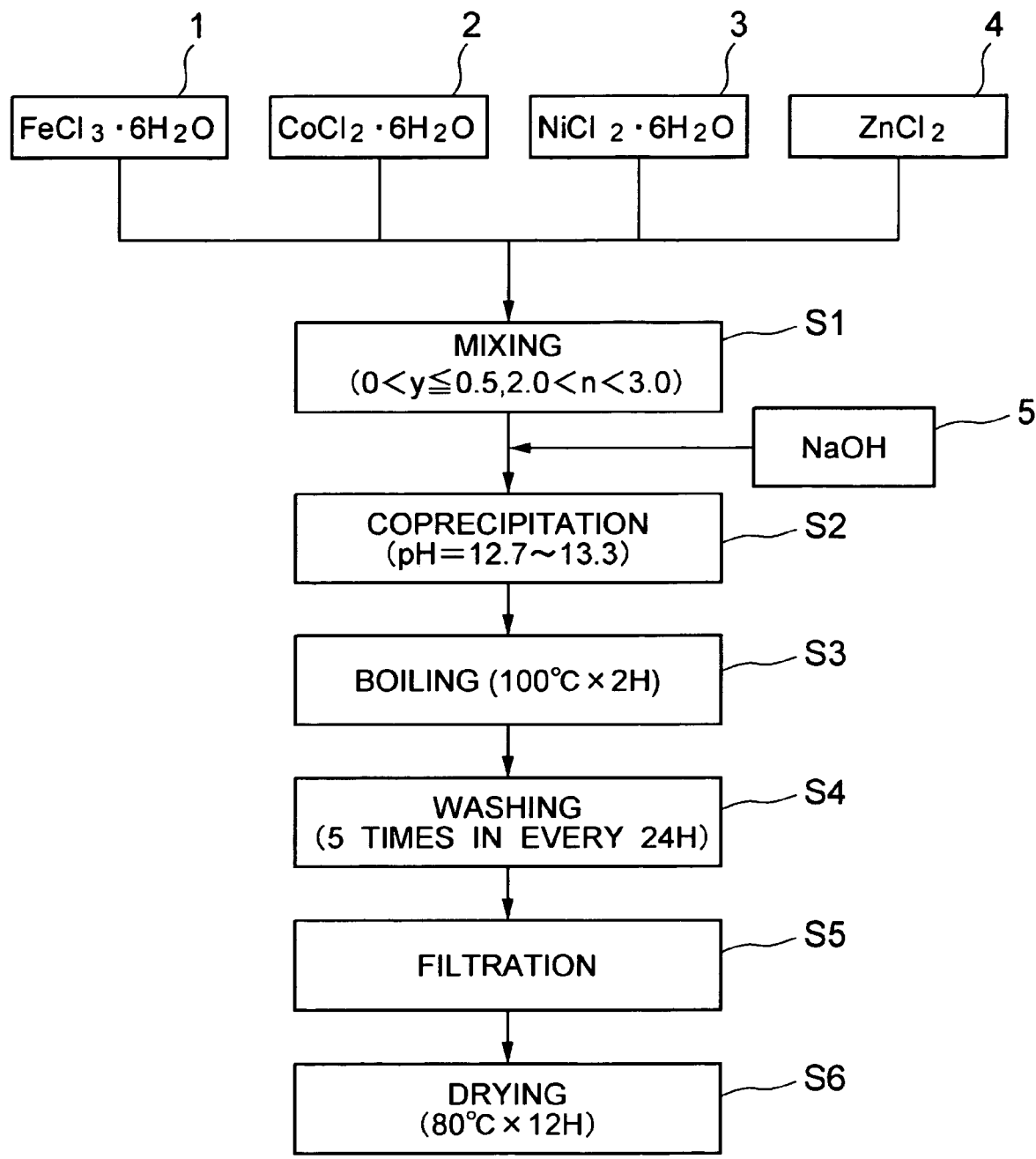
FIG. 1 is a flowchart showing a method of preparing spinel ferrimagnetic particles of the present invention.

The features which are common to all the following Examples (the case where M is Zn, Mn, Mg, etc) will be described by referring to the case where M is Zn. First, described is a method of preparing the Co—Ni—Zn system spinel ferrimagnetic particles of the present invention by referring to FIG. 1. FIG. 1 is a flowchart showing the preparing method.

As described above, the spinel ferrimagnetic particles to be prepared is expressed by a composition formula $(CoO)_{0.5-x}(NiO)_{0.5-y}(MO)_{x+y} \cdot n/2(Fe_2O_3)$ at the time of preparation, where a value of n (molar ratio)=$Fe/(Co+Ni+Zn)$ is $2.0 < n < 3.0$, which is larger than stoichiometric amount (n=2) of a spinel ferrite and less than that of 1.5 times. Further, it is a composition in which the values of x, y satisfy $0 \leq x < 0.5$, $0 \leq y < 0.5$, $0 < x+y < 0.5$. In other words, it is obtained by substituting a part of Co(CoO) or Ni (NiO), or a part of combination of Co(CoO) and Ni(NiO) among the composition of the conventional Co—Ni system spinel ferrite with Zn (ZnO) as a bivalent metal. The superparamagnetic fine particles contained in the spinel ferrimagnetic particles produced as described above becomes 5% by mass or less, which are substantially zero. Thereby, it is possible to obtain a magnetic material with the very small and uniform particle diameters, having an excellent magnetic property such as high coercivity. Moreover, the superparamagnetic fine particles contained in said spinel ferromagnetic particles becomes 5% by mass or less, which are substantially zero, so that stable recording can be maintained when used for recording media. Especially, it is an excellent magnetic material to be used for the recording media, even for a magnetic tape which is used in a wound state without causing magnetic transcription. The specific preparing method will be described in the followings.

First, water soluble metallic salt as a raw material is dissolved in pure water. Specifically, used as the raw material metallic salt are reagent chemicals such as $FeCl_3 \cdot 6H_2O$ (iron chloride hexahydrate(1)), $CoCl_2 \cdot 6H_2O$ (cobalt chloride hexahydrate (2)), $NiCl_2 \cdot 6H_2O$ (nickel chloride hexahydrate (3)), and $ZnCl_2$ (zinc chloride (4)). As for an alkaline solution used at the time of coprecipitation, a reagent chemical of NaOH(sodium hydroxide (5)) is used. Each of the raw materials or the alkaline aqueous solution is not limited to the ones described above.

Then, each of the solutions containing cobalt, nickel, zinc is mixed to prepare a mixed solution (step S1). The value of $n=Fe/(Co+Ni+Zn)$ as the molar ratio of Fe and $(Co+Ni+Zn)$ is adjusted to satisfy $2.0 < n < 3.0$.

In Examples 1 to 4 as will be described in the followings, the value of x in the above-described composition expression is fixed to x=0 and only NiO is substituted with ZnO. Thus, the substitution amount can be expressed by "y" and the value of y is set to satisfy $0 < y < 0.5$. Also, the Example 5 shows a case where the value of y is fixed to y=0 and only a part of CoO is substituted with ZnO. Further, as will be described in Example 6, the same effect can be achieved even when a part of the both is substituted with ZnO. It is also the same in the cases where M is Mn, Mg, etc.

The reason for setting the value of n to satisfy $2.0 < n < 3.0$ is as follows. First of all, the composition with n>2.0 produces single-phase ferrimagnetic particles. In the composition with n>3.0, there is excessive amount of Fe so that ferric oxide is to be contained. Also, the composition with n=2.0 produces two-phase ferrimagnetic particles. Further, in the one with n<2.0, there is an excessive amount of bivalent metallic ions with a total of Co and Ni with respect to Fe, thereby containing heterotopic-phase particles. When the composition with two or more phases is mixed, the magnetic properties as the magnetic material are deteriorated. Therefore, by setting the value of n to satisfy 2.0<n<3.0, it enables to produce the particles with the single-phase composition so that the quality of magnetic properties can be improved. More preferably, the value of may be set to satisfy 2.2<n<2.8.

Subsequently (following the step S1), a coprecipitation containing solution is prepared through adding the alkaline aqueous solution 5 to the mixed solution while well-stirring the mixed solution and coprecipitating a precipitate by adjusting pH value to satisfy $12.0 \leq pH \leq 14.0$ (step S2). At this time, especially, coprecipitation may be performed by setting the pH value to be 13.0<pH<13.7.

Then, the mixed solution (precipitation slurry) with the precipitate is boiled by being heated at 100° C. for 2 hours (step S3) for producing black particles from the metal-mixed precipitate by a condensation polymerization reaction. Then, the black particles are washed five times in every 24 hours (step S4) and are retrieved by being filtered using a No. 2 filter paper (step S5).

Subsequently, the filtered substance is dried at 80° C. for 12 hours using a thermostatic chamber (step S6) for obtaining the black particles of the Co—Ni—Zn spinel fine particles by pulverizing the dried substance in a mortar.

The heat treatment in the above-described step S3 is not limited to be performed at 100° C. and it is preferable to be performed at 80° C.-120° C. Also, the treatments such as the filtration, washing, drying and the like are not limited to be performed under the above-described conditions.

Subsequently, for measuring the magnetic properties of the obtained ferrite particles, a magnetic sheet is formed by applying the ferrite particles uniformly on a PET film in 15 μm thickness using a doctor blade, orienting the particles in a magnetic field of 0.8 MA/m and then drying them. The magnetic properties of the sample are measured by a vibrating sample magnetometer (VSM), the crystalline structure of the particles is investigated by diffraction patterns obtained by an X-ray diffraction instrument, and the particle size is observed by transmission electron microscope (TEM) (FeKα is used). The magnetic anisotropic constant of the sample magnetic sheet is measured by using a torque magnetometer and, further, the rotational hysteresis loss (Wr/Ms) is investigated.

In each of the following Examples, the spinel ferrimagnetic particles of the above-described composition are prepared by varying the substitution amount x+y of the ZnO, the molar ratio n, and the pH value at the time of coprecipitation, respectively. FIG. 2 shows each of the producing conditions and FIG. 3-FIG. 9 show the results of the measurements on the magnetic properties. Further, FIG. 10 shows the magnetic properties in the case where M is Mn.

EXAMPLE 1

First, as the raw material metallic salt, iron chloride hexahydrate, cobalt chloride hexahydrate, nickel chloride hexahydrate and zinc chloride were poured into pure water in glass beakers, respectively, to be resolved for preparing:

(1-1): 200 [ml] of $Fe^{3+}$ solution with 0.25 [mol/l], 100 [ml] of $Co^{2+}$ solution with 0.10 [mol/l], and 100 [ml] of $Ni^{2+}$ solution with 0.10 [mol/l];

(1-2): 200 [ml] of $Fe^{3+}$ solution with 0.25 [mol/l], 100 [ml] of $Co^{2+}$ solution with 0.10 [mol/l], 90 [ml] of $Ni^{2+}$ solution with 0.10 [mol/l], and 10 [ml] of $Zn^{2+}$ solution with 0.10 [mol/l]; and (1-3): 200 [ml] of $Fe^{3+}$ solution with 0.25 [mol/l], 100 [ml] of $Co^{2+}$ solution with 0.10 [mol/l], 40 [ml] of $Ni^{2+}$ solution with 0.10 [mol/l], and 60 [ml] of $Zn^{2+}$ solution with 0.10 [mol/l]. These solutions were poured into heat-resistant beakers with the volume of 1 litter, to which a pH meter and a thermometer were mounted. Thereby, for all of (1-1), (1-2), (1-3), 400 [ml] of the mixed solutions of n (=Fe/(Co+Ni+Zn))=2.25 were prepared.

Then, while stirring for mixing, 200-500 [ml] of caustic soda with 3 [mol/l] concentration prepared separately was poured therein for producing 600-900 [ml] of precipitation slurry, respectively, from the metallic salt mixed solutions by the neutralization. At this time, coprecipitation was performed at pH=13.0.

Then, the precipitation slurry was heated at 100° C. for 120 minutes for producing black particles from the metal-mixed precipitate by a condensation polymerization reaction. Then, the particles were washed five times in every 24 hours by decantation and were retrieved by being filtered using a No. 2 filter paper. The filtered substance was dried at 80° C. for 12 hours using a thermostatic chamber, and the black particles were obtained by pulverizing the dried substance in a mortar.

The obtained black particles were of the composition formula $(CoO)_{0.5}(NiO)_{0.5-y}(ZnO)_y \cdot n/2(Fe_2O_3)$, where $$n=2.5, y=0 \quad (1\text{-}1):$$

$$n=2.5, y=0.05 \quad (1\text{-}2):$$

$$n=2.5, y=0.3 \quad (1\text{-}3):$$

Figure 4:
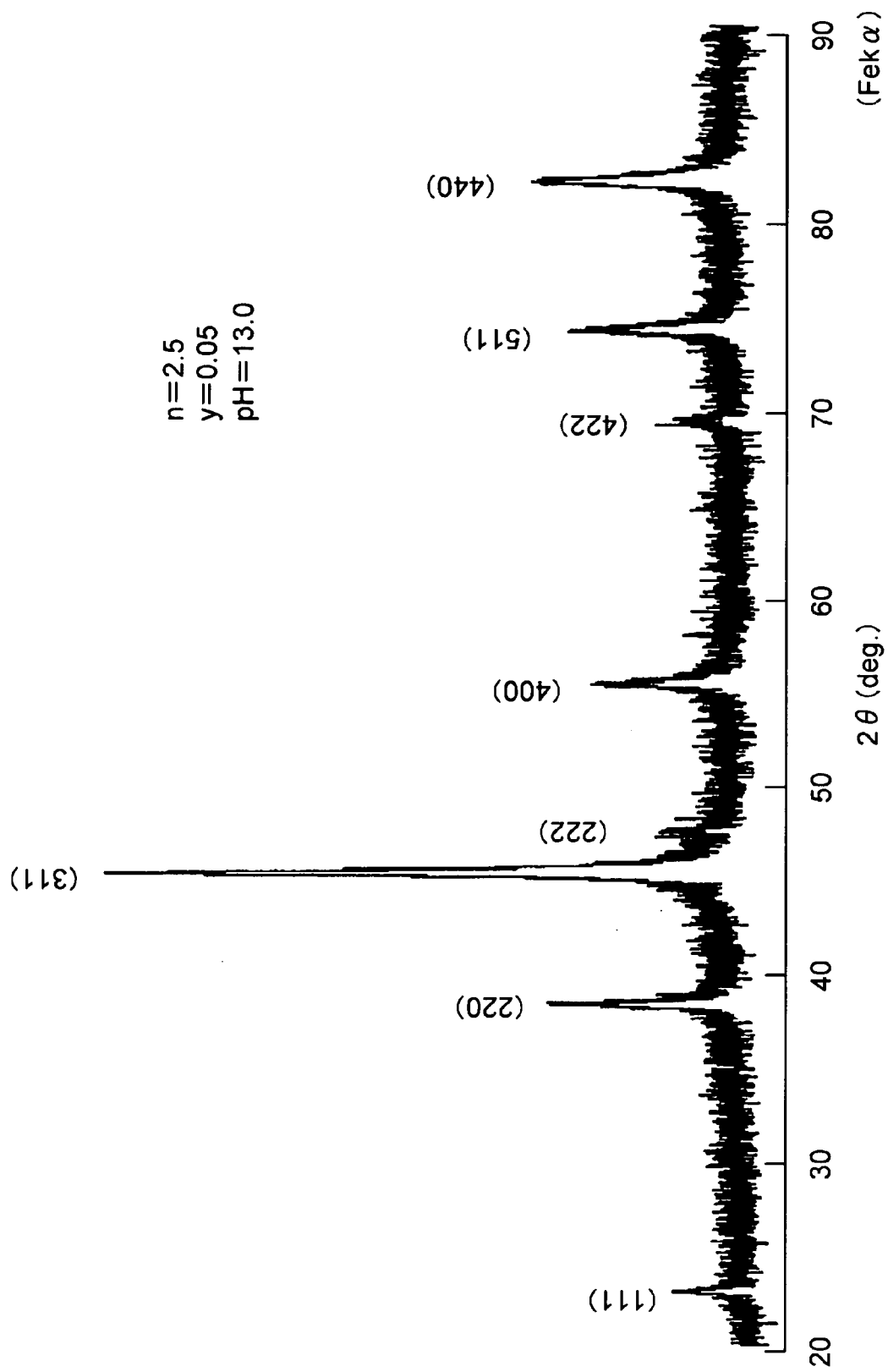
FIG. 4 is an illustration showing an X-ray diffraction pattern of the prepared magnetic particles of the Example 1.
Figure 5:
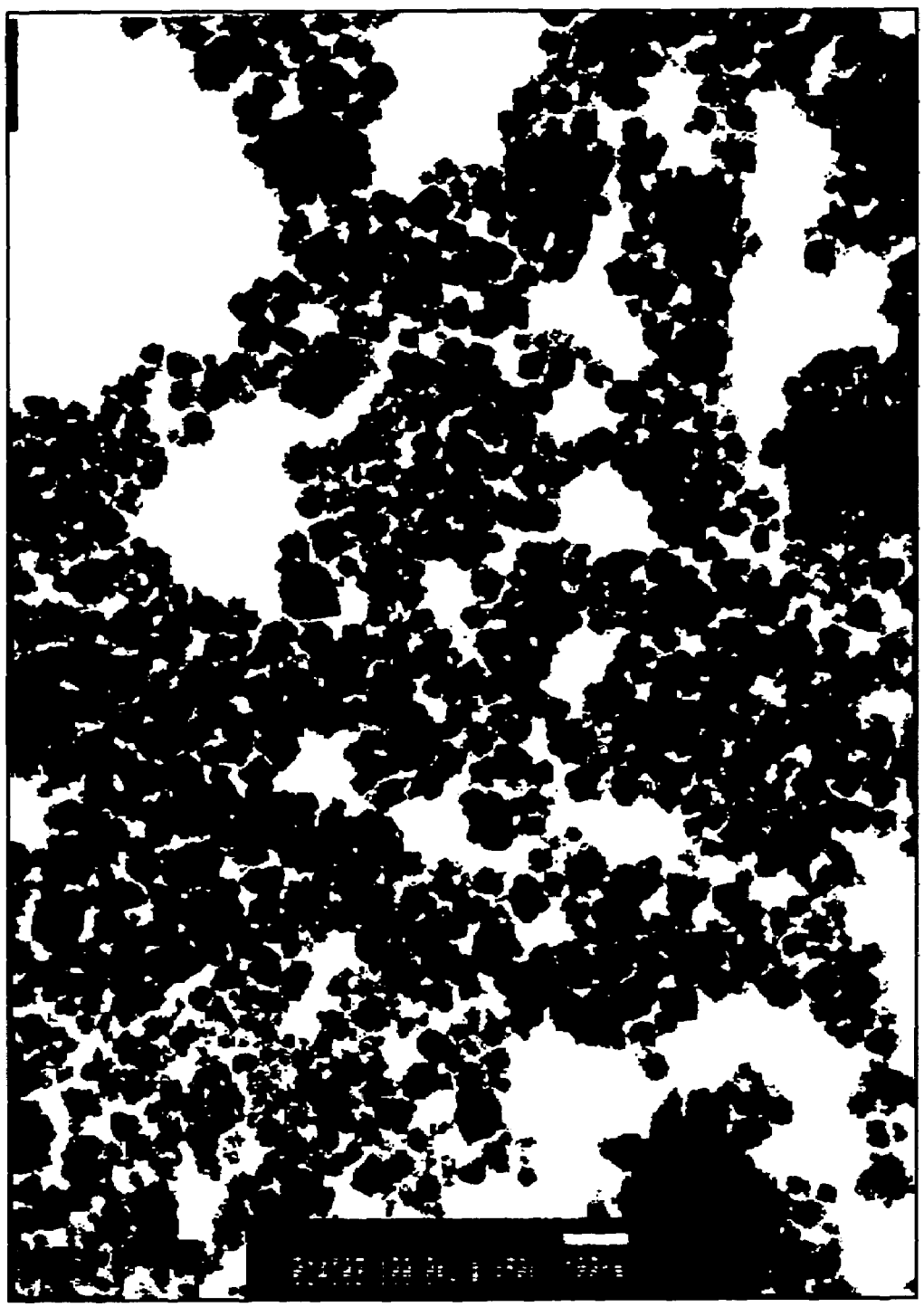
FIG. 5 is an electron microscope TEM photograph of the prepared magnetic particles of Example 1.

From the results of the measurements by the X-ray diffraction, it was found that each had a crystalline structure of spinel crystal. FIG. 4 shows the X-ray diffraction patterns of the particles produced under the (1-2) condition described above. From the results of observation by a transmission electron microscope (TEM), it was found that the particles were monodisperse fine particles in substantially cubic form with an average diameter of approximately 38 [nm]. The state is shown in FIG. 5 which is an electron microscope TEM photograph of the produced particles. As can be seen from the photograph, it is possible to produce extremely small and uniform particles.

The magnetic properties of each particle were measured using a vibrating sample magnetometer (VSM). An excellent result was obtained especially under the (1-2) condition (n=2.5, y=0.05), and the particles were the single-phase spinel ferrimagnetic fine particles with the saturation magnetization σs of $62.0 \times 10^{-6}$ [Wb·m/kg], the remanent magnetization σr of $36.6 \times 10^{-6}$ [Wb·m/kg], and the coercivity HcJ of 372 [kA/m].

Also, particles were produced in the same manner by changing the value of y, ZnO substitution amount, to 0<y<0.5, and the magnetic properties of the particles such as the saturation magnetization, remanent magnetization and coercivity were measured. From the result, as in the above-described case, it was verified that they were the particles with high magnetic properties with the small and uniform particle diameters.

Especially, the coercivity was normally 239-637 [kA/m] (3000-8000 [Oe]), which was 1.6 times or more the value of Ba ferrite fine particles (as described in "Background Art", the optimum coercivity HcJ of the Ba ferrite is 239 [kA/m]) which had been developed conventionally. Also, the saturation magnetization as was normally $50.3\times10^{-6}$-$88.0\times10^{-6}$ [Wb·m/kg] (40-70 [emu/g]), which was higher than the conventional particles.

As described, obtained are fine particles having the high coercivity with the uniform particle diameters, so that it is possible to form recording media of high qualities. Further, as verified in Example 4 which will be described later, there were almost no superparamagnatic particles contained in the magnetic particles. Thus, the work for removing the superparamagnetic substances becomes unnecessary and the particles can be used as a preferable magnetic material for recording media.

Especially, the spinel ferrimagnetic particles of the Example having the above-described properties can be preferably used for magnetic recording tapes. That is, because there is an issue that a stable recording and maintaining cannot be achieved in the cases where: in the laminated area where the magnetic recording tape is being wound, the magnetic force cannot be maintained stable in an area with a weak coercivity if, first of all, the coercivity is nonuniform, so that magnetic transcription is caused between the areas of the magnetic tape overlapping with each other; and in the area with the superparamagnetism, the magnetized state is varied according to the magnetic state of the overlapped area of the magnetic tape so that, as the case described above, the magnetic transcription is caused. Therefore, with the magnetic recording medium, especially, the magnetic tape, containing the magnetic particles of the Example, due to having the magnetic properties such as the superparamagnetic particle content of almost zero as described above, it enables to suppress the magnetic transcription in the laminated areas so that the magnetic information can be stably recorded and maintained. Similarly, it is preferable to use the magnetic particles, which are produced in each Example as will be described later, for the magnetic recording media.

Also, the produced spinel ferrimagnetic particles may be solidified by binder for fabricating a bonded magnet. Thereby, for example, it can be used as a bonded magnet for a motor. Moreover, a plastic magnet for injection molding or a sheet-type plastic magnet may be fabricated by mixing the produced spinel ferrimagnetic particles and a thermoplastic resin. Thereby, it is possible to fabricate each type of magnet with higher coercivity than that of the conventional case. In the same manner as described above, the bonded magnets and the like may be fabricated using the magnetic particles produced in each Example as will be described later.

EXAMPLE 2

Next, in Example 2, the magnetic fine particles were produced by varying the values of the molar ratio n. As the raw material metallic salt, iron chloride hexahydrate, cobalt chloride hexahydrate, nickel chloride hexahydrate and zinc chloride were poured into pure water in glass beakers, respectively, to be resolved for preparing:

(2-1): 200 [ml] of $Fe^{3+}$ solution with 0.2 [mol/l], 100 [ml] of $Co^{2+}$ solution with 0.1 [mol/l], 90 [ml] of $Ni^{2+}$ solution with 0.1 [mol/l]; and 10 [ml] of $Zn^{2+}$ solution with 0.1 [mol/l]

(2-2): 200 [ml] of $Fe^{3+}$ solution with 0.225 [mol/l], 100 [ml] of $Co^{2+}$ solution with 0.1 [mol/l], 90 [ml] of $Ni^{2+}$ solution with 0.1 [mol/l], and 10 [ml] of $Zn^{2+}$ solution with 0.1 [mol/l];

(2-3): 200 [ml] of $Fe^{3+}$ solution with 0.25 [mol/l], 100 [ml] of $Co^{2+}$ solution with 0.1 [mol/l], 90 [ml] of $Ni^{2+}$ solution with 0.1 [mol/l], and 10 [ml] of $Zn^{2+}$ solution with 0.1 [mol/l];

(2-4): 200 [ml] of $Fe^{3+}$ solution with 0.275 [mol/l], 100 [ml] of $Co^{2+}$ solution with 0.1 [mol/l], 90 [ml] of $Ni^{2+}$ solution with 0.1 [mol/l], and 10 [ml] of $Zn^{2+}$ solution with 0.1 [mol/l]; and (2-5): 200 [ml] of $Fe^{3+}$ solution with 0.3 [mol/l], 100 [ml] of $Co^{2+}$ solution with 0.1 [mol/l], 90 [ml] of $Ni^{2+}$ solution with 0.1 [mol/l], and 10 [ml] of $Zn^{2+}$ solution with 0.1 [mol/l]. These solutions were poured into heat-resistant beakers with the volume of 1 litter, to which a pH meter and a thermometer were mounted, for preparing, respectively, 400 [ml] of the mixed solutions, where:

(2-1): n (=Fe/(Co+Ni+Zn))=2.0, (2-2): n (=Fe/(Co+Ni+Zn))=2.25, (2-3): n (=Fe/(Co+Ni+Zn))=2.5, (2-4): n (=Fe/(Co+Ni+Zn))=2.75, (2-5): n (=Fe/(Co+Ni+Zn))=3.0.

Then, while stirring for mixing, 200-500 [ml] of caustic soda with 3 [mol/l] concentration prepared separately was poured therein for producing 600-900 [ml] of precipitated slurry, respectively, from the metallic salt mixed solutions by the neutralization. At this time, coprecipitation was performed at pH=13.0.

Then, the precipitated slurry was heated at 100° C. for 120 minutes for producing black particles from the metal-mixed precipitate by a condensation polymerization reaction. Then, the particles were washed five times in every 24 hours by decantation and were retrieved by being filtered using a filter paper. The filtered substance was dried at 80° C. for 12 hours using a thermostatic chamber, and the black particles were obtained by pulverizing the dried substance in a mortar.

The obtained black particles were of the composition formula $(CoO)_{0.5}(NiO)_{0.5-y}(ZnO)_y \cdot n/2(Fe_2O_3)$, where

| | |
|---|---|
| n=2.0, y=0.05 | (2-1): |
| n=2.25, y=0.05 | (2-2): |
| n=2.5, y=0.05 | (2-3): |
| n=2.75, y=0.05 | (2-4): |
| n=3.0, y=0.05 | (2-5): |

From the results of the measurements by the X-ray diffraction, it was found that, as in the case shown in FIG. 3, each had a crystalline structure of spinel crystal. From the results of observation by a transmission electron microscope (TEM), it was found that, as the case shown in FIG. 4, the particles were monodisperse fine particles in substantially cubic form.

Figure 6:
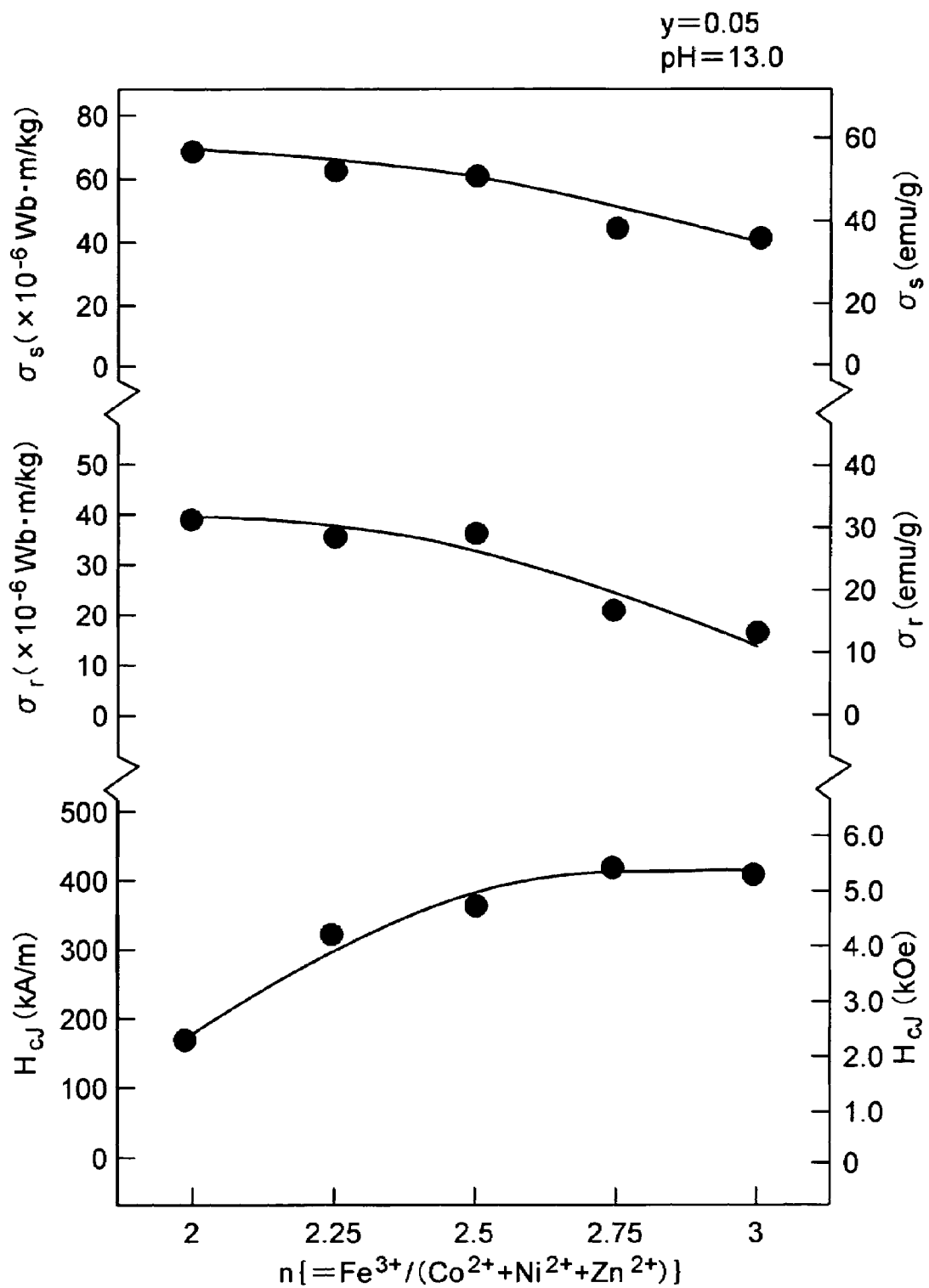
FIG. 6 is a graph for showing the magnetic properties of the prepared magnetic particles of Example 2, which specifically shows saturation magnetization, remanent magnetization, and coercivity of the prepared magnetic particles with a composition formula of $(CoO)_{0.5}(NiO)_{0.45}(ZnO)_{0.05} \cdot n/2(Fe_2O_3)$, where values of the molar ratio $n=Fe/(Co+Ni+Zn)$ are varied within the range of $2.0 \leq n \leq 3.0$.

The magnetic properties of each particle were measured using a vibrating sample magnetometer (VSM). FIG. 6 shows the results. That is, in the Example of the particles with the composition formula $(CoO)_{0.5}(NiO)_{0.5-y}(ZnO)_y \cdot n/2(Fe_2O_3)$, the pH value at the time of coprecipitation was fixed to be pH=13.0 and the value of y as the ZnO substitution amount was fixed to be y=0.05, while the value of the molar ratio n=Fe/(Co+Ni+Zn) was varied within the range of $2.0 \leq n \leq 3.0$ for producing the fine particles. The magnetic properties of the particles such as the saturation magnetization, remanent magnetization and the coercivity were measured.

It was found that the coercivity HcJ increased in accordance with the increase of the value of the molar ratio n=Fe/(Co+Ni+Zn), while maintaining high values of the saturation magnetization σs and the remanent magnetization σr. An excellent result was obtained especially under the (2-3) condition (n=2.5, y=0.05), and the particles were the single-phase spinel ferrimagnetic fine particles with the saturation magnetization σs of $62.0\times10^{-6}$ [Wb·m/kg], remanent magnetization σr of $36.6\times10^{-6}$ [Wb·m/kg] and the coercivity HcJ of 372 [kA/m].

Also, it was verified that the superparamagnetic particle content in the produced magnetic particle was 5% by mass or less. Especially, when the value of n was within the range of $2.2<n<2.8$, the superparamagnetic particle content was 2% by mass or less. Since the superparamagnetic particle content was substantially zero, the magnetic material can be stably magnetized so that it can be preferably used for the magnetic recording medium.

EXAMPLE 3

Next, in Example 3, the magnetic particles were produced by varying the pH values at the time of coprecipitation. As the raw material metallic salt, iron chloride hexahydrate, cobalt chloride hexahydrate, nickel chloride hexahydrate and zinc chloride were poured into pure water in glass beakers, respectively, to be resolved for preparing 200 [ml] of $Fe^{3+}$ solution with 0.25 [mol/l], 100 [ml] of $Co^{2+}$ solution with 0.1 [mol/l], 90 [ml] of $Ni^{2+}$ solution with 0.1 [mol/l]; and 10 [ml] of Zn solution with 0.1 [mol/l] in each of the cases (3-1), (3-2), (3-3). These solutions were poured into heat-resistant beakers with the volume of 1 liter, in which a pH meter and a thermometer were mounted, for preparing 400 [ml] of the mixed solutions of n $(=Fe/(Co+Ni+Zn))=2.5$ Then, while stirring for mixing, 200-500 [ml] of caustic soda with 3 [mol/l] concentration prepared separately was poured therein for producing 600-900 [ml] of precipitation slurry, respectively, from the metallic salt mixed solutions by the neutralization. At this time, coprecipitation was performed at different pH values as shown below.

pH=12.7 (3-1):

pH=13.0 (3-2):

pH=13.3 (3-3):

Then, the precipitation slurry was heated at 100° C. for 120 minutes for producing black particles from the metal-mixed precipitate by a condensation polymerization reaction. Then, the particles were washed five times in every 24 hours by decantation and were retrieved by being filtered using a No. 2 filter paper. The filtered substance was dried at 80° C. for 12 hours using a thermostatic chamber, and the black particles were obtained by pulverizing the dried substance in a mortar.

The obtained black particles were of the composition formula $(CoO)_{0.5}(NiO)_{0.5-y}(ZnO)_y \cdot n/2(Fe_2O_3)$, and n=2.5, y=0.05 in all the cases. As described above, varied were the pH values at the time of coprecipitation.

From the results of the measurements by the X-ray diffraction, it was found that, as in the case shown in FIG. 4, each had a crystalline structure of spinel crystal. Also, from the results of observation by a transmission electron microscope (TEM), it was found that, as the case shown in FIG. 5, the particles were monodisperse fine particles in substantially cubic form.

Shown in the followings are a part of the results of the measurements performed on the magnetic properties of the particles of each case using a vibrating sample magnetometer (VSM).

(3-2): the saturation magnetization σs was $62.0 \times 10^{-6}$ [Wb·m/kg], the remanent magnetization σr was $36.6 \times 10^{-6}$ [Wb·m/kg], and the coercivity HcJ was 372.6 [kA/m]

(3-3): the saturation magnetization σs was $62.8 \times 10^{-6}$ [Wb·m/kg], the remanent magnetization σr was $37.0 \times 10^{-6}$ [Wb·m/kg], and the coercivity HcJ was 372.9 [kA/m]

Excellent properties were observed especially in the fine particles which were produced when the pH values were pH=13.0, pH=13.3.

EXAMPLE 4

Next, magnetic sheets were formed by using the obtained fine particles with the excellent properties. The composition of the fine particles used for the magnetic sheet was $(CoO)_{0.5}(NiO)_{0.45}(ZnO)_{0.05} \cdot 1.25(Fe_2O_3)$, (where, n=2.5, y=0.05) and the pH value at the time of coprecipitation was pH=13.0. As for the magnetic properties, the saturation magnetization σs was $62.0 \times 10^{-6}$ [Wb·m/kg], the remanent magnetization σr was $36.6 \times 10^{-6}$ [Wb·m/kg], and the coercivity HcJ was 372.6 [kA/m].

Now, conditions of preparing a magnetic coating material are shown below.

(Condition 1) Weight Percentage of Magnetic Particles to Mixed Solution (Weight Percentage of Magnetic Particles to Mixed Solution when Solid Content (Magnetic Particles+Resin) Concentration was Set 25 wt %)

magnetic particles: 1 mixed solution of resin (binder) and a solvent: 4 glass beads (diameter of approximately 0.3 mm): 8

(Condition 2) Weight percentage of mixed solution of resin and solvent copolymer of vinyl chloride: 1 cyclohexane: 6.21 toluene: 6.21

MEK: 2.59

(Condition 3) Dispersing device: a mixer mill (8000-D model, a product of SPEX)

(Condition 4) Dispersion time: 8 hours

As for the method for forming the magnetic sheet, right after applying the magnetic coating material, which was prepared under the above-described conditions, uniformly on a 15 □m thick PET film using a doctor blade, it was oriented in a magnetic field of 0.8 MA/m (10 kOe) and dried.

Methods of evaluating the magnetic properties were as follows.

(Evaluation Method 1) Magnetization Curves were Measured by Using the Aforementioned VSM.

(Evaluation Method 2) Magnetic Anisotropic Constants $K_1$ and $K_2$ were Determined from the Following Equation After Performing Fourier Analysis on the Torque Curves Measured by Using the Torque Magnetometer.

$$L = -(K_1/4 + K_2/64)\sin 2\square - (3K_1/8 + K_2/16)\sin 4\square + (3K_2/63)\sin 6\square$$

As for the aforementioned equation, the following literature was used as the reference.

Reference: S. Chikazumi, et al., "Physics of Ferromagnetic Substance, Second Edition" SHOKABO Publishing Co., Ltd, chapter 12, pp 13, 1984.

(4-B3) The anisotropic magnetic field Ha was measured by using the torque magnetometer. As for the method for measurement, the following literatures were used as the reference.

Reference: I. S. Jacobs and F. E.. Luborsky, J. Appl. Phys., vol. 28 pp 467-473, D. M. Paige, S. R. Hoon, B. K. Tanner and KO'Grady, IEEE Trans. Magen., vol. 20, pp 1852-1854, 1984.

Figure 7:
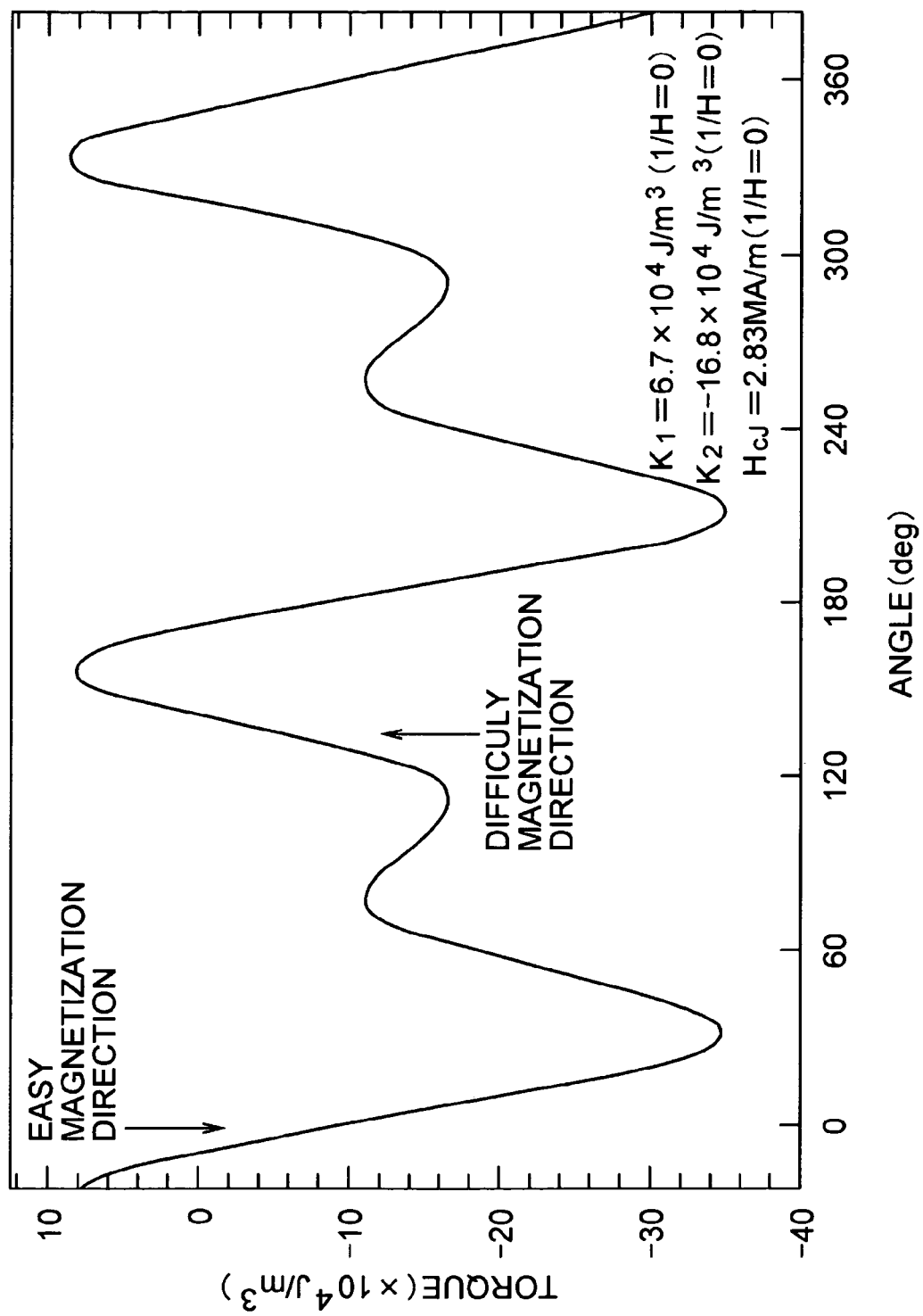
FIG. 7 is a graph showing a torque curve of a magnetic sheet formed in Example 4.
Figure 8:
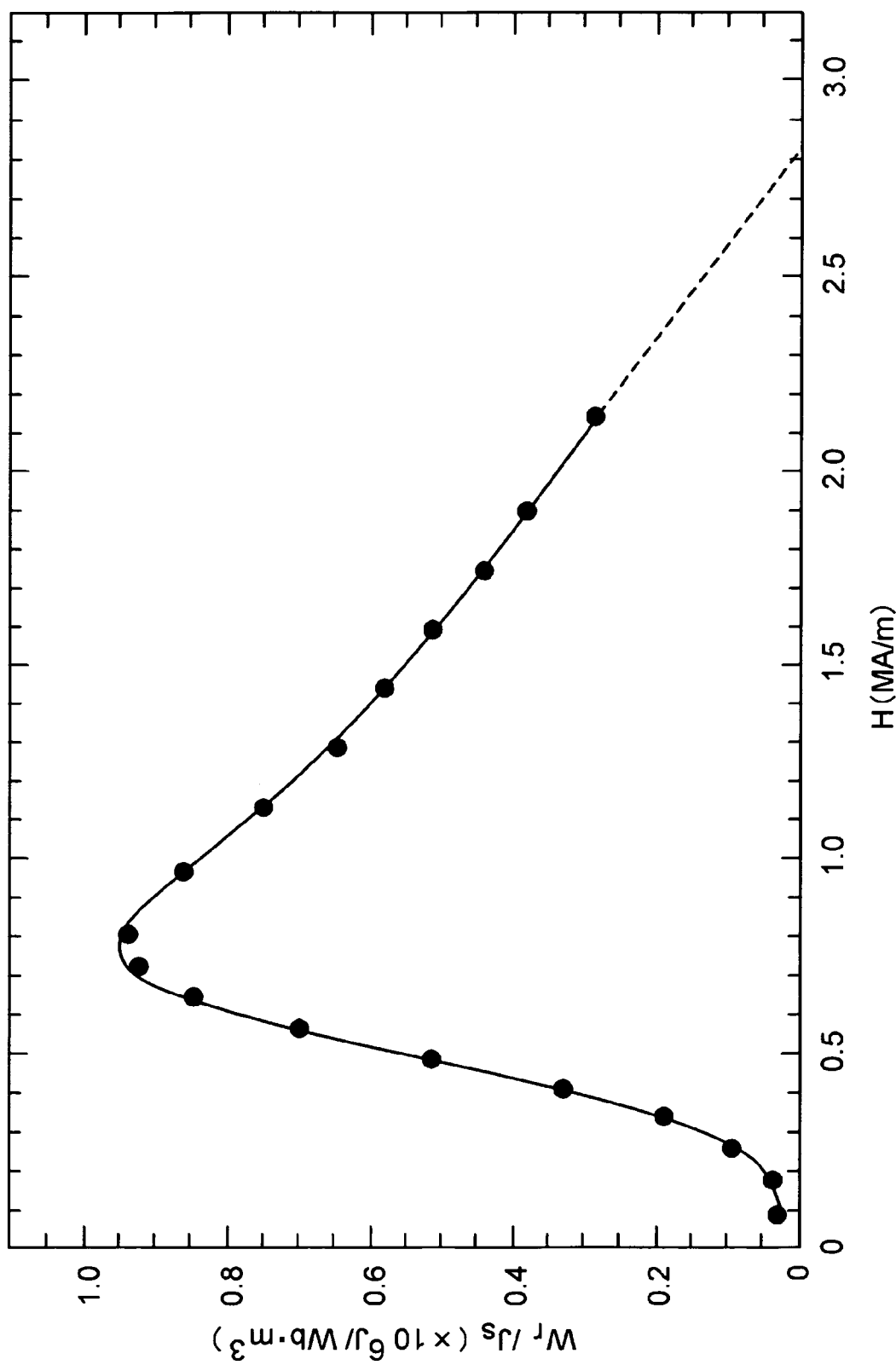
FIG. 8 is a graph showing a change in rotational hysteresis loss of the magnetic sheet formed in Example 4 for the external magnetic field.

The magnetic anisotropy measured in the manner as described above will be described by referring to FIG. 7-FIG. 9. FIG. 7 shows the torque curve of each of the above-described spinel fine particles which were measured in the magnetic field of 2.15 [MA/m]. FIG. 8 shows the rotational hysteresis loss.

As shown in FIG. 7, the values of $K_1$ and $K_2$ in 300K were $K_1 \approx +6.7 \times 10^4$ J/cm$^3$ and $K_2 \approx -16.8 \times 10^4$ J/cm$^3$. Also, the rotational hysteresis loss was evaluated by having the value of Wr/Js corresponding to the rotational hysteresis loss as the ordinate axis and the external magnetic field H as the abscissa axis. As for the anisotropic magnetic field Ha, approximately 2.8 [MA/m] was obtained and form the result, it was found that the magnetic sheet formed by using the spinel ferrimagnetic fine particles of the present invention had high magnetic anisotropy.

FIG. 9 shows the hysteresis loops of the fine particles of the above-described compositions. In the graph, (1) is the loop of the composition formula $(CoO)_{0.5} (NiO)_{0.45} (ZnO)_{0.05} \cdot 1.25 (Fe_2O_3)$ and coprecipitation was performed at pH=13.0, while (2) is that of $(CoO)_{0.5} (NiO)_{0.5} \cdot 1.125(Fe_2O_3)$ and coprecipitation was performed at pH=13.3. In other words, (1) is the hysteresis loop of the Co—Ni—Zn system spinel ferrimagnetic fine particles as the present invention and (2) is that of the conventional Co—Ni system spinel ferrimagnetic fine particles. In the graph, the value of the saturation magnetization increases without saturating as the intensity of the magnetic field increases. This is considered to be caused since the superparamagnetic substances are magnetized. Thus, it is understood that the superparamagnetic substances are contained in the conventional Co—Ni system spinel ferrite (2). On the contrary, as for the Co—Ni—Zn system spinel ferrite (1) produced in the Example, the magnetization is substantially saturated in the ferromagnetic field, so that it is found to be fine particles with almost no superparamagnetic substance.

In short, in the Example, Co—Ni—Zn system spinel ferrimagnetic particles of the above-described composition are produced by substituting a part of NiO of the Co—Ni system spinel ferromagnetic fine particles expressed by the composition formula $(CoO)_x(NiO)_y \cdot 2/n(Fe_2O_3)$ with ZnO. Thereby, the coercivity becomes as high as about 1.6 times that of Ba ferrite and the saturation magnetization is increased by 21% compared to that of the conventional Co—Ni ferrite. Therefore, it can be said that it is a magnetic material with excellent magnetic properties. Moreover, the superparamagnetic particle content is almost zero so that, as described above, the magnetic recording medium containing the magnetic particles is of high quality.

EXAMPLE 5

Next, Example 5 of the present invention will be described. The composition of the spinel ferrimagnetic particle is $(CoO)_{0.5-x}(NiO)_{0.5} (ZnO)_x \cdot n/2(Fe_2O_3)$, where the value of the molar ratio of Fe to (Co+Ni+Zn), that is, n=Fe/(Co+Ni+Zn), is 2.0<n<3.0, and the value of x is 0<x<0.5.

That is, while Example 1 describes the spinel ferrimagnetic fine particles obtained by substituting a part of NiO of the conventional Co—Ni system spinel ferrimagnetic particles with ZnO, in Example 5, the value of y is fixed to "0" and a part of CoO is substituted with ZnO.

The producing method comprises the steps of: preparing mixed solutions by mixing each of the solutions, whose composition formula is $(CoO)_{0.5-x}(NiO)_{0.5} (ZnO)_x \cdot n/2(Fe_2O_3)$, containing, respectively, water soluble metallic salts of iron, cobalt, nickel, zinc, in such a manner that the value of x satisfies 0<x<0.5 and the value of the molar ratio of Fe to (Co+Ni+Zn), that is, n=Fe/(Co+Ni+Zn), satisfies 2.0<n<3.0; attaining a coprecipitation containing solution by adding alkaline aqueous solution to the mixed solution and performing coprecipitation of the precipitate through adjusting the pH value; and producing particles by heat-treating, filtering, washing and drying the coprecipitation containing substance. In the step of performing the coprecipitation, it is performed by setting the pH value to be $12.0 \leq pH \leq 14.0$. The details of the steps are the same as the case of Example 1 so that the detailed description will be omitted.

With such composition, similarly, it is possible to attain the spinel ferromagnetic fine particles with excellent magnetic properties, in which the particle diameter is small and uniform, the coercivity is high, and also there is no superparamagnetic substance contained.

EXAMPLE 6

Next, Example 6 of the present invention will be described. The composition formula of the spinel ferrimagnetic particle is $(CoO)_{0.5-x} (NiO)_{0.5-y} (ZnO)_{x+y} \cdot n/2(Fe_2O_3)$, where, the value of the molar ratio of Fe to (Co+Ni+Zn), that is, n=Fe/(Co+Ni+Zn), is 2.0<n<3.0, and the value of x is 0≦x<0.5, the value of y is 0≦y<0.5, and the value of x+y is 0<x+y<0.5

That is, while the above-described Examples describes the spinel ferrimagnetic fine particles obtained by substituting a part of either NiO or CoO of the conventional Co—Ni system spinel ferrimagnetic particles with ZnO, in Example 6, a part of both CoO and NiO is substituted with ZnO.

The producing method comprises the steps of: preparing mixed solutions by mixing each of the solutions, whose composition formula is $(CoO)_{0.5-x} (NiO)_{0.5-y} (ZnO)_{x+y} \cdot n/2 (Fe_2O_3)$, containing, respectively, water soluble metallic salts of iron, cobalt, nickel, zinc, in such a manner that the value of the molar ratio n=Fe/(Co+Ni+Zn) satisfies 2.0<n<3.0 and the values of x, y satisfy 0≦x<0.5, 0≦y<0.5, 0<x+y<0.5; attaining a coprecipitation containing solution by adding alkaline aqueous solution to the mixed solution and performing coprecipitation of the precipitate through adjusting the pH value; and producing particles by heat-treating, filtering, washing and drying the coprecipitation containing substance. In the step of performing the coprecipitation, it is performed by setting the pH value to be $12.0 \leq pH \leq 14.0$. The details of the steps are the same as the case of Example 1 so that the detailed description will be omitted.

With such composition, similarly, it is possible to attain the spinel ferromagnetic fine particles with excellent magnetic properties, in which the particle diameter is small and uniform, the coercivity is high, and also there is no superparamagnetic substance.

EXAMPLE 7

Next, Example 7 of the present invention will be described. The spinel ferrimagnetic particles of Example 7 differs from the above-described Examples, and are Co—Ni—Mn system spinel ferrimagnetic particles in which M as the bivalent metal is Mn. In other words, the spinel ferrimagnetic particles are the ones in which a part of NiO and CoO of the conventional Co—Ni system spinel ferrimagnetic particles is substituted with MnO.

As for the specific composition, the composition formula is $(CoO)_{0.5-x} (NiO)_{0.5-y} (MnO)_{x+y} \cdot n/2(Fe_2O_3)$, where, the value of the molar ratio of Fe to (Co+Ni+Mn), that is, n=Fe/(Co+Ni+Mn), is 2.0<n<3.0, and the value of x is 0≦x<0.5, the value of y is 0≦y<0.5, and the value of x+y is 0<x+y<0.5. The producing method is the same as that of the above-described Examples.

FIG. 10-FIG. 12 show the magnetic properties of the Co—Ni—Mn system spinel ferrimagnetic particles of the above-described composition, in which the values of x, y, n and the value of the pH at the time of coprecipitation were varied. The data of this experiment shows the case where the value of x was set to be x=0.

As shown in these figures, the coercivity of the magnetic particles is much higher than that of the conventional spinel ferrimagnetic particles. Moreover, as the above-described case of containing Zn, it was verified that the superparamagnetic particle content was almost zero. Therefore, the particles are excellent in magnetic properties and are preferably used especially for magnetic recording media.

INDUSTRIAL APPLICABILITY

The spinel ferrimagnetic particles of the present invention have the small and uniform particle diameter, high coercivity, saturation magnetization and remanent magnetization, and also have a characteristic that the superparamagnetic particle content is almost zero. Thus, it is a magnetic material with extremely high magnetic properties. Therefore, it can be preferably used as magnetic recording medium and it enables to achieve stabilization of the recording state and high recording density.

What is claimed is:

1. Spinel ferrimagnetic particles, a composition formula of which when prepared is $(CoO)_{0.5-x}(NiO)_{0.5-y}(MO)_{x+y} \cdot n/2 (Fe_2O_3)$ (M is a bivalent metal except Co and Ni), where,
   a value of n (molar ratio)=Fe/(Co+Ni+M) is 2.0<n<3.0, which is larger than stoichiometric amount (n=2) of a spinel ferrite and less than that of 1.5 times, and,
   values of said x, y satisfy 0≦x<0.5, 0≦y<0.5, 0<x+y<0.5, wherein,
   also, superparamagnetic fine particles contained in said spinel ferrimagnetic particles produced by coprecipitation is 5% by mass or less.

2. The spinel ferrimagnetic particles according to claim 1, wherein said M is a metal selected from either Zn or Mn.

3. The spinel ferrimagnetic particles according to claim 1, wherein:
   the value of said n is 2.2<n<2.8;
   the values of said x, y satisfy 0≦x<0.2, 0≦y<0.2, 0.01<x+y<0.2; and
   superparamagnetic fine particles contained in said spinel ferrimagnetic particles is 2% by mass or less.

4. The spinel ferrimagnetic particles according to claim 1, wherein coercivity is 239-637 [kA/m] and saturation magnetization is $50.3 \times 10^{-6}$-$88.0 \times 10^{-6}$ [Wb·m/kg].

5. The spinet ferrimagnetic particles according to claim 1, prepared through a forming process comprising the steps of:
   preparing mixed solutions by mixing each solution containing iron, cobalt, nickel and said M as water soluble metallic salt, respectively, by satisfying said conditions of x, y, n;
   preparing solutions containing coprecipitation substance by adding an alkaline aqueous solution to said mixed solutions and adjusting pH value to be 12.0≦pH≦14.0; and
   producing fine particles by heat-treating said solutions containing coprecipitation substance at 80° C.-120° C., and then performing filtration, washing and drying.

6. The spinel ferrimagnetic particles according to claim 5, wherein said step of preparing said solutions containing coprecipitation substance is a step of preparing solutions containing coprecipitation substance by adjusting pH values to 13.0<pH<13.7.

7. A magnetic recording medium containing said spinel ferrimagnetic particles according to claim 1.

* * * * *

UNITED STATES PATENT AND TRADEMARK OFFICE
CERTIFICATE OF CORRECTION

PATENT NO.       : 7,399,523 B2
APPLICATION NO.  : 10/530330
DATED            : July 15, 2008
INVENTOR(S)      : Yamamoto et al.

Page 1 of 1

It is certified that error appears in the above-identified patent and that said Letters Patent is hereby corrected as shown below:

On the title page, in (56) References Cited under Other Publications in H. Yamamoto et al., "Co-Mi" should be --Co-Ni--.

On the title page of the printed patent, in (56) References Cited under Other Publications in I.S. Jacobs et al., after Hysteresis insert --in--.

At column 14, line 14 (claim 5, line 1) of the printed patent, "spinet" should be --spinel--.

Signed and Sealed this

Tenth Day of March, 2009

JOHN DOLL
*Acting Director of the United States Patent and Trademark Office*